United States Patent
Yamauchi et al.

(10) Patent No.: US 8,162,724 B2
(45) Date of Patent: Apr. 24, 2012

(54) SURFACE TREATING METHOD AND APPARATUS

(75) Inventors: Yoshikazu Yamauchi, Higashine (JP); Hiroshi Akiba, Higashine (JP); Takuya Sugiyama, Higashine (JP); Nobuhiro Yamada, Higashine (JP)

(73) Assignee: Showa Denko K.K., Tokyo (JP)

( * ) Notice: Subject to any disclaimer, the term of this patent is extended or adjusted under 35 U.S.C. 154(b) by 832 days.

(21) Appl. No.: 12/270,555

(22) Filed: Nov. 13, 2008

(65) Prior Publication Data

US 2009/0298389 A1 Dec. 3, 2009

(30) Foreign Application Priority Data

May 29, 2008 (JP) ................. 2008-140393

(51) Int. Cl.
*B24B 1/00* (2006.01)

(52) U.S. Cl. ............. 451/36; 451/41; 451/42; 451/57; 451/67; 451/178; 451/446

(58) Field of Classification Search .......... 451/36, 451/60, 178, 446, 450–451, 41, 42, 548, 451/57, 67; 125/20
See application file for complete search history.

(56) References Cited

U.S. PATENT DOCUMENTS

| | | | |
|---|---|---|---|
| 5,688,360 A * | 11/1997 | Jairath | 156/345.12 |
| 5,707,274 A * | 1/1998 | Kim et al. | 451/285 |
| 5,709,593 A * | 1/1998 | Guthrie et al. | 451/287 |
| 5,735,731 A * | 4/1998 | Lee | 451/143 |
| 5,775,983 A * | 7/1998 | Shendon et al. | 451/444 |
| 5,967,881 A * | 10/1999 | Tucker | 451/41 |
| 6,106,374 A * | 8/2000 | Boggs et al. | 451/60 |
| 6,220,936 B1 * | 4/2001 | Quek | 451/41 |
| 6,547,652 B1 * | 4/2003 | Roy | 451/285 |
| 6,620,029 B2 * | 9/2003 | Khoury et al. | 451/6 |
| 7,367,873 B2 * | 5/2008 | Ishii et al. | 451/168 |
| 2008/0188167 A1 * | 8/2008 | Ishii et al. | 451/307 |
| 2009/0298389 A1 * | 12/2009 | Yamauchi et al. | 451/36 |

FOREIGN PATENT DOCUMENTS

| | | |
|---|---|---|
| JP | A 11-354480 | 12/1999 |
| JP | A 2000-108022 | 4/2000 |
| JP | A 2007-105624 | 4/2007 |

* cited by examiner

*Primary Examiner* — George Nguyen (74) *Attorney, Agent, or Firm* — Greer, Burns & Crain, Ltd.

(57) ABSTRACT

A surface treating apparatus treats a substrate surface by rotating a cylindrical polishing member in a state where the polishing member makes contact with the substrate surface. A polishing liquid is supplied to a polishing liquid passage that is provided in a central portion of the polishing member, and the polishing liquid is supplied to the substrate surface by rotating the polishing member while filtering the polishing liquid by a foam member provided on an outer periphery of the polishing liquid passage. Aperture diameters of the foam member are larger on the side of the polishing liquid passage than on the outside of the polishing member.

13 Claims, 9 Drawing Sheets

FIG.9

SURFACE TREATING METHOD AND APPARATUS

BACKGROUND OF THE INVENTION

1. Field of the Invention

The present invention generally relates to surface treating methods and apparatuses, and more particularly to a surface treating method a surface treating apparatus which are suited for treating a substrate surface of a magnetic recording medium and the like.

2. Description of the Related Art

In magnetic recording media such as magnetic disks, a spacing between a head and the magnetic recording medium, that is, a floating amount of the head from the magnetic recording medium, needs to be small in order to achieve a high recording density. The floating amount of the head can be reduced by reducing a substrate surface roughness of the magnetic recording medium.

Conventionally, the substrate surface of the magnetic disk is subjected to a texturing process which carries out a texturing in a circumferential direction of the substrate or, to a polishing process which smoothens and polishes the substrate surface. However, the texturing process and the polishing process cannot avoid damage or the so-called scratches to the substrate surface caused by mixing of foreign particles into a polishing liquid. The generation of scratches is a big obstacle to realizing a high-density recording.

Figure 1A:
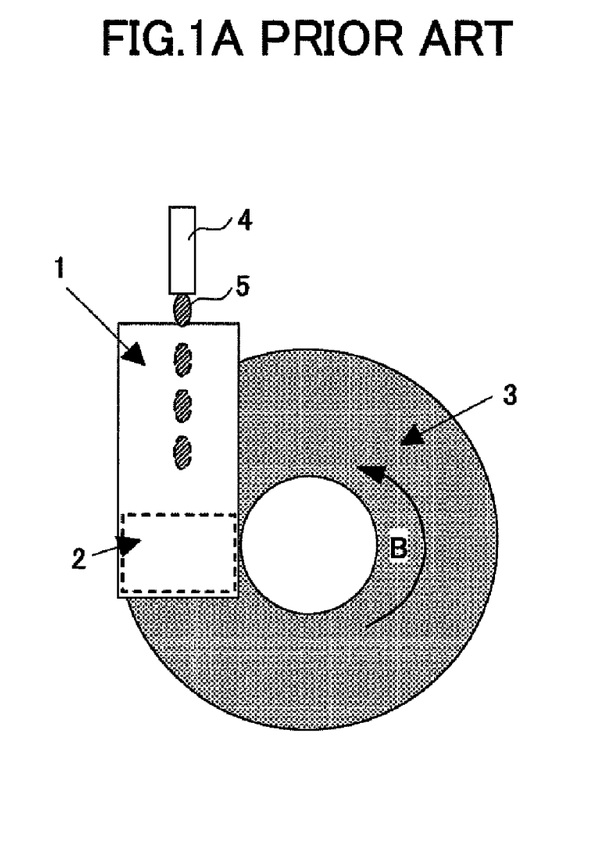
FIGS. 1A and 1B are diagrams for explaining an example of a conventional surface treating method.
Figure 1B:
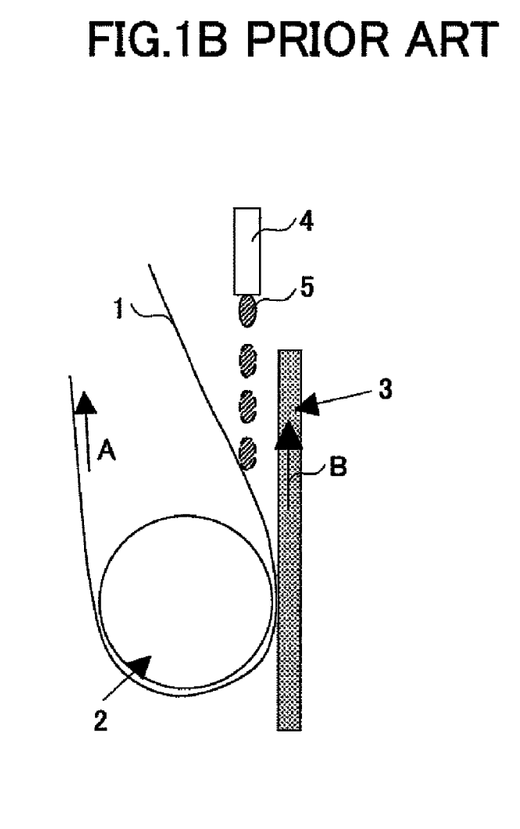

FIGS. 1A and 1B are diagrams for explaining an example of a conventional surface treating method. FIG. 1A is a front view showing a part of a surface treating apparatus, and FIG. 1B is a side view showing a part of the surface treating apparatus. A driving unit (not shown) feeds a polishing tape 1 in a tape feeding direction A via a robber roller 2. A polishing liquid (or slurry) 5 is supplied from a drop-feed nozzle 4, between the tape 1 and a disk substrate 3. The disk substrate 3 is rotated in a direction B as the tape 1 is fed in the tape feeding direction A in a state where the disk substrate 3 makes contact with the tape 1. As a result, the surface of the disk substrate 3 is polished.

Foreign particles may be mixed into the polishing liquid 5 itself or, foreign particles may mix into the polishing liquid 5 when the polishing liquid 5 is supplied from the drop-feed nozzle 4 between the tape 1 and the disk substrate 3 depending on an external environment. In such cases, the foreign particles form scratches on the surface of the disk surface 3 when the tape 1 polishes the surface of the disk substrate 3, and prevent the surface roughness from being further reduced. In addition, a reproduced output obtained from portions formed with the scratches is low compared to that obtained from normal portions on the disk surface 3, and the portions formed with the scratches become defective portions. The problem described above is also encountered when a polishing member other than the tape 1, such as a pad, is used.

For example, disk cleaning apparatuses are proposed in Japanese Laid-Open Patent Applications No. 2007-105624, No. 2000-108022 and No. 11-354480.

If the foreign particles are mixed into the polishing liquid itself or, the foreign particles mix into the polishing liquid when the polishing liquid is being supplied, it is difficult to reduce the surface roughness of the substrate in the case of the conventional surface treating method because the scratches are formed on the substrate surface when the substrate surface is polished.

SUMMARY OF THE INVENTION

Accordingly, it is a general object of the present invention to provide a novel and useful surface treating method and apparatus, in which the problems described above are suppressed.

Another and more specific object of the present invention is to provide a surface treating method and a surface treating apparatus, which can suppress generation of scratches on a substrate surface, and reduce the surface roughness of the substrate, to thereby reduce defective portions on the substrate surface.

According to one aspect of the present invention, there is provided a surface treating method for treating a substrate surface by at least one of polishing and texturing in a predetermined direction by rotating a cylindrical polishing member in a state where the polishing member makes contact with the substrate surface, comprising the steps of supplying a polishing liquid to a polishing liquid passage that is provided in a central portion of the polishing member along a rotary axis of the polishing member, and supplying the polishing liquid to the substrate surface by rotating the polishing member about the rotary axis while filtering the polishing liquid by a foam member provided on an outer periphery of the polishing liquid passage, wherein aperture diameters of the foam member are larger on the side of the polishing liquid passage than on the outside of the polishing member.

According to another aspect of the present invention, there is provided a surface processing apparatus comprising a cylindrical polishing member having a polishing liquid passage provided in a central portion thereof along a rotary axis of the polishing member, and a foam member provided on an outer periphery of the polishing liquid passage, where the foam member has aperture diameters that are larger on the side of the polishing liquid passage than on the outside of the polishing member; a polishing liquid supply unit configured to supply a polishing liquid to the polishing liquid passage; and a driving unit configured to rotate the polishing member, wherein a substrate surface is treated by at least one of polishing and texturing in a predetermined direction by rotating the polishing member by the driving unit in a state where the polishing member makes contact with the substrate surface and supplying the polishing liquid to the substrate surface from the polishing member while filtering the polishing liquid by the foam member.

According to one aspect of the present invention, it is possible to suppress generation of scratches on the substrate surface, and to reduce the surface roughness of the substrate, to thereby reduce defective portions on the substrate surface.

Other objects and further features of the present invention will be apparent from the following detailed description when read in conjunction with the accompanying drawings.

DESCRIPTION OF THE PREFERRED EMBODIMENTS

In one embodiment of the present invention, a surface treating method and a surface treating apparatus supply a polishing liquid into a polishing member when treating a substrate surface by making the polishing member contact the substrate surface. The polishing liquid which is filtered within the polishing member reaches the substrate surface by being dialyzed via the polishing member. In a case where the substrate is a disk substrate and the polishing member is a cylindrical brush, the substrate surface is subjected to a treatment, such as a polishing and/or a texturing in a circumferential direction, when the cylindrical brush is rotated.

The filtering of the polishing liquid within the polishing member may be made in one or a plurality of filtering stages.

Accordingly, even if foreign particles are mixed into the polishing liquid itself or, foreign particles mix into the polishing liquid when the polishing liquid is supplied, the foreign particles are filtered within the polishing member and will not be supplied to the substrate surface.

Next, a description will be given of each embodiment of the surface treating method and the surface treating apparatus according to the present invention, by referring to FIG. 2A and the subsequent figures.

Figure 2A:
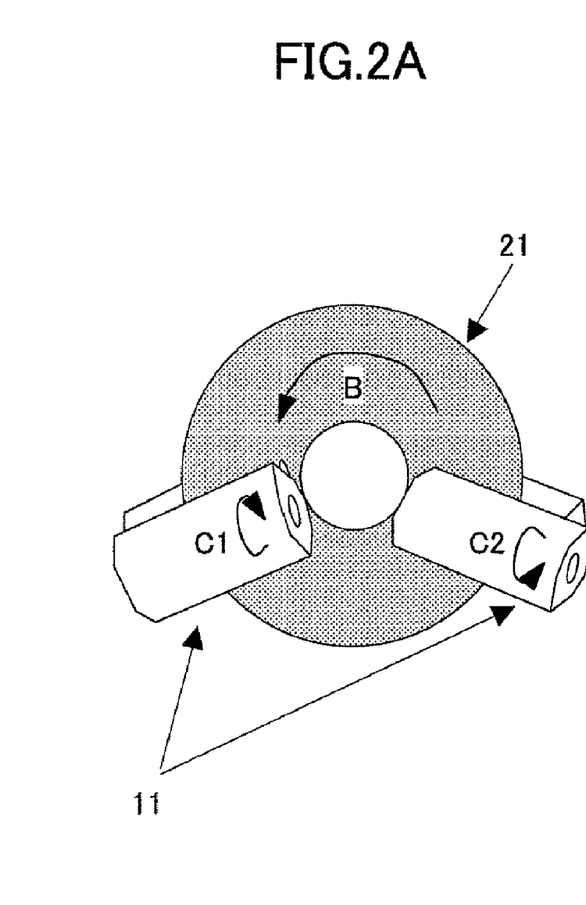
FIGS. 2A and 2B are diagrams for explaining a surface treating apparatus in an embodiment of the present invention.
Figure 2B:
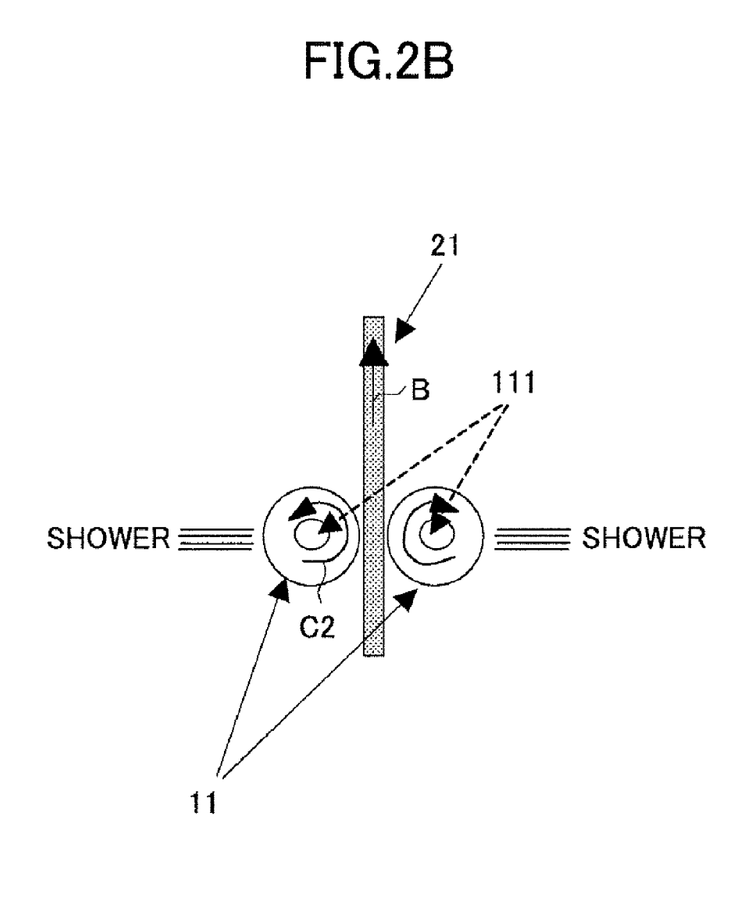

FIGS. 2A and 2B are diagrams for explaining the surface treating apparatus in an embodiment of the present invention. FIG. 2A is a front view showing a part of a surface treating apparatus, and FIG. 2B is a side view showing a part of the surface treating apparatus. The surface treating apparatus shown in FIGS. 2A and 2B has a plurality of polishing members 11. In this embodiment, two polishing members 11 are provided with respect to each of two surfaces of a disk substrate 21, however, it is sufficient to provide at least one polishing member 11 with respect to each of the two surfaces of the disk substrate 21. When the polishing members 11 are provided with respect to both the two surfaces of the disk substrate 21, it is possible to simultaneously carry out a surface treating with respect to the two surfaces of the disk substrate 21. Because the two polishing members 11 shown in FIG. 2A are rotated by a driving unit (not shown) in directions indicated by arrows C1 and C2, the disk substrate 21 rotates in a direction indicated by an arrow B. A material forming the disk substrate 21 is not limited to a particular material. In this embodiment, the disk substrate 21 is formed by an aluminum substrate which has been plated with NiP, for example.

In this embodiment, the disk substrate 21 is rotated according to the rotations of the polishing members 11, and no driving unit is provided to rotate the disk substrate 21. However, it is of course possible to additionally provide a driving unit for rotating the disk substrate 21. In this case, whether to rotate the disk substrate 21 along the rotating direction of the polishing member 11 or, to rotate the disk substrate 21 in a direction opposite to the rotating direction of the polishing member 11, may be selected depending on the surface treatment to be carried out.

In FIG. 2B, a shower of a cleaning liquid (or cleaner) from a cleaning unit (not shown) is supplied to clean the surface of the polishing member 11 at an arbitrary timing, however, the cleaning unit may be omitted. The shower of the cleaning liquid removes residual particles, such as polishing powder, residue and the like, which are adhered on the surface of the polishing member 11, by the so-called jet-spray. The cleaning effect may further be improved by using a cleaning liquid which has been applied with ultrasonic waves in the cleaning unit.

Figure 3:
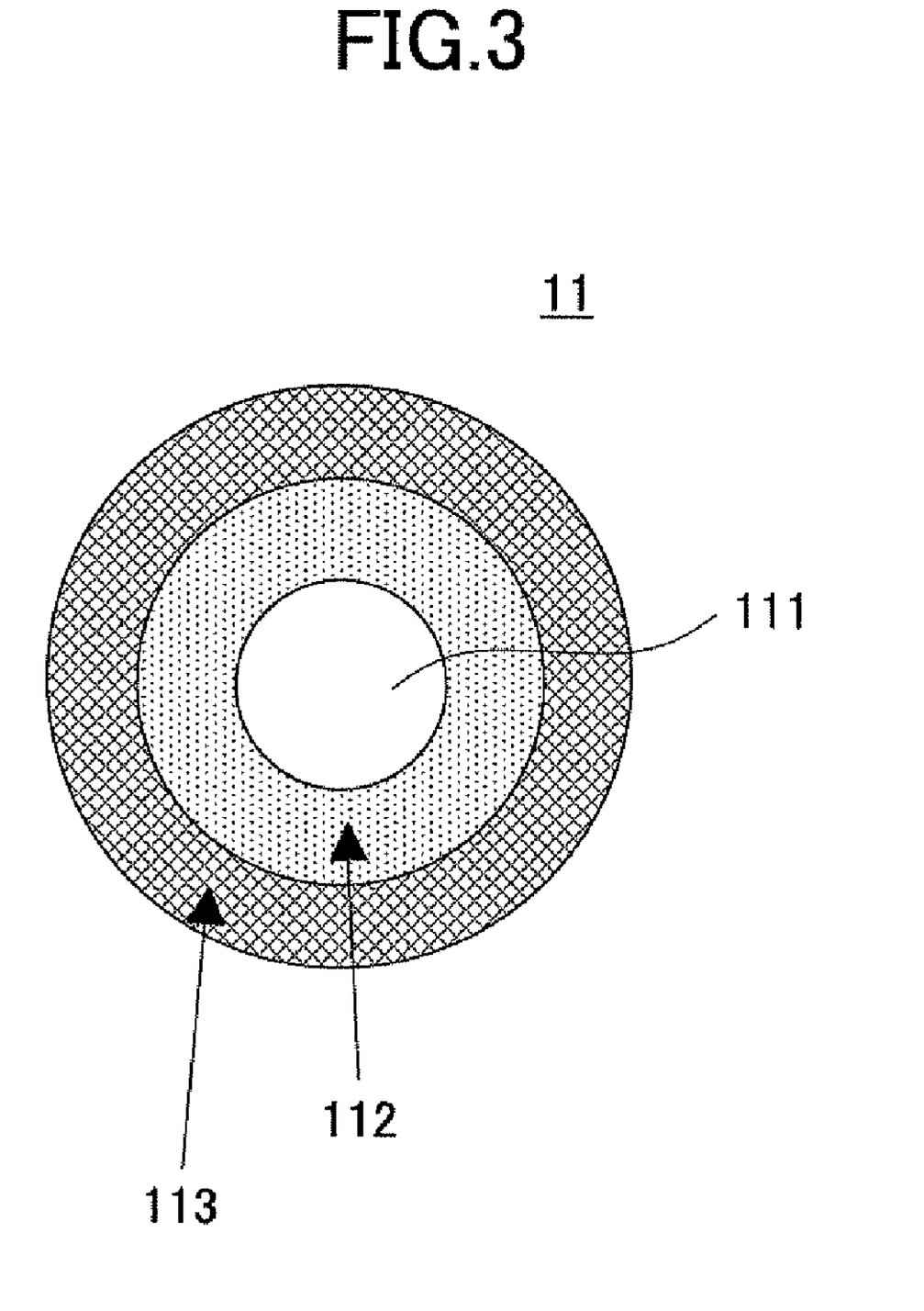
FIG. 3 is a cross sectional view showing a polishing member.

FIG. 3 is a cross sectional view showing the polishing member 11. FIG. 3 shows a cross section along a plane perpendicular to a rotary axis (or rotary shaft) of the polishing member 11. In this embodiment, the polishing member 11 is formed by a cylindrical brush. The polishing member 11 has a polishing liquid passage 111 in a central portion along the rotary axis thereof, a first foam (or sponge or porous) member 112, and a second foam (or sponge) member 113. The first foam member 112 is provided between the polishing liquid passage 111 and the second foam member 113. The first foam member 112 has apertures with a diameter D1, and the second foam member 113 has apertures with a diameter D2, where D2>D1. The polishing liquid passage 111, the first foam member 112 and the second foam member 113 are provided coaxially. For example, the second foam member 113 is made of Poly-Vinyl-Alcohol (PVA), and has a filtering accuracy of approximately 1 μm. On the other hand, the first foam member 112 is made of Poly-Vinyl-Alcohol (PVA) and has the aperture diameter D1 of approximately 100 μm to approximately 200 μm. For example, a PVA sponge BELLCLEAN (registered trademark) manufactured by AION Co., Ltd. may be used as the PVA having the aperture diameter described above.

Of course, the materials used for the first and second foam members 112 and 113 are not limited to PVAs, and it is possible to use materials such as polyurethane and polyolefine for the first and second foam members 112 and 113. The second foam member 113 has a function of contributing to the actual polishing by making contact with the surface of the disk substrate 21, and thus, it is desirable to form the second foam member 113 from a soft material which will not easily generate scratches on the surface of the disk substrate 21. On the other hand, the first foam member 112 has a function of capturing foreign particles, that is, large particles (or grains) included in a polishing liquid (or slurry) which is supplied from the polishing liquid passage 111, and thus, unlike the second foam member 113, it is not necessary to form the first foam member 112 from a soft material. The foreign particles included in the polishing member may be mixed into the polishing liquid itself or, may mix into the polishing liquid when the polishing liquid is supplied to the polishing liquid passage 111.

The polishing liquid is not limited to a particular polishing liquid. For example, it is possible to use a polishing liquid (hereinafter referred to as a diamond abrasive grain polishing liquid) which includes diamond abrasive grains with a grain diameter D50=0.2 μm, a polishing slurry using cerium oxide, a polishing slurry using colloidal silica, or the like.

Figure 4:
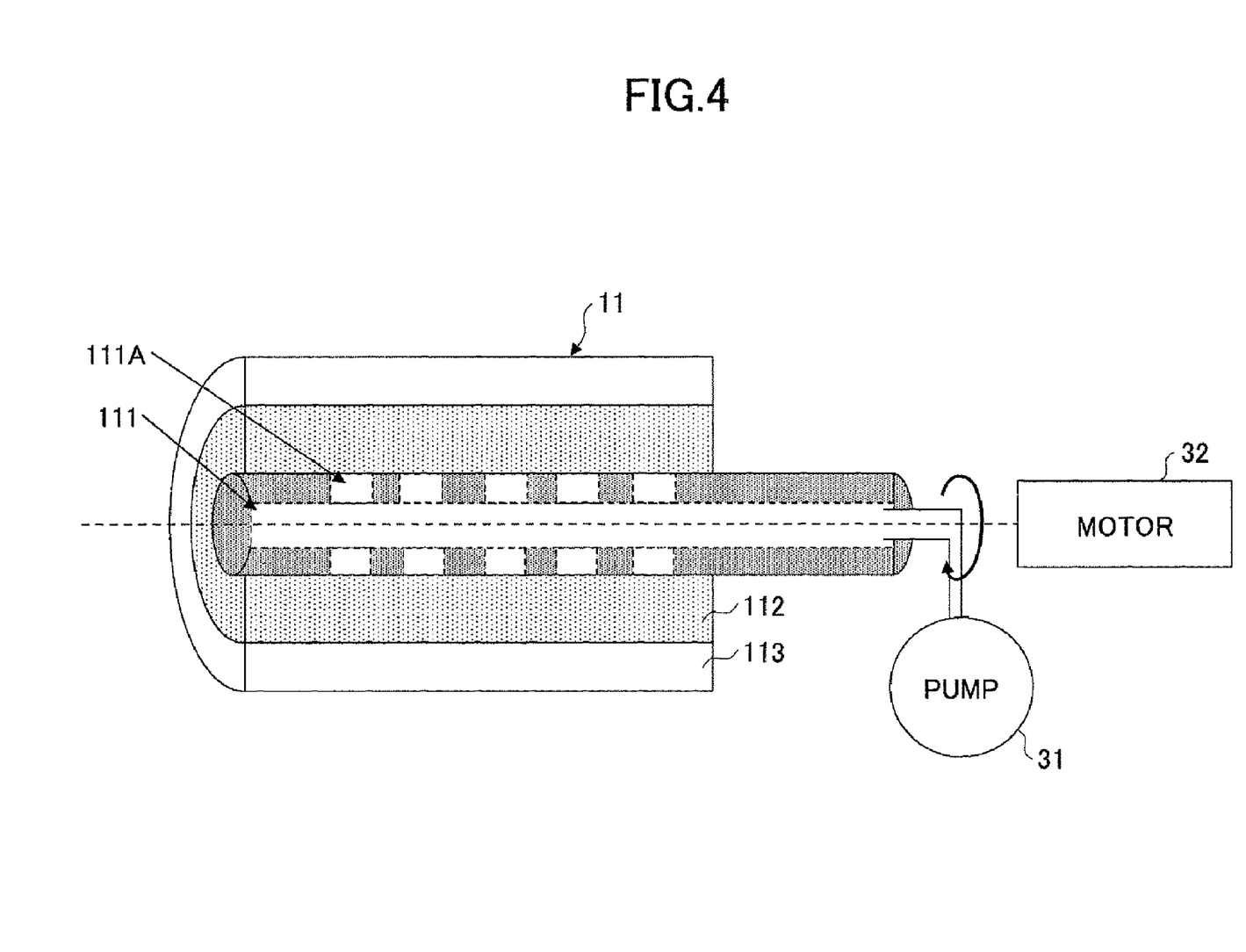
FIG. 4 is a cross sectional view showing a part of the polishing member.

FIG. 4 is a cross sectional view showing a part of the polishing member 11. FIG. 4 shows a cross section along a plane parallel to the rotary axis of the polishing member 11. The polishing liquid passage 111 has a hollow cylindrical shape and has a plurality of penetration holes 111A. The polishing liquid passage 111 also functions as a rotary shaft of the polishing member 11, and the polishing member 11 is rotated in a direction of an arrow in FIG. 4 by a motor 32 via a known rotation transmitting mechanism or means (not shown). The motor 32 and the rotation transmitting mechanism or means form the driving unit described above. On the other hand, the polishing liquid within a tank (not shown) is supplied to the polishing liquid passage 111 by a pump 31.

The pump 31 forms a polishing liquid supply unit for supplying the polishing liquid to the polishing member 11, and supplies the polishing liquid to the polishing liquid passage 111 via a known mechanism or means which does not interfere with the rotation of the polishing member 11. The polishing liquid which is supplied to the polishing liquid passage 111 is supplied in an approximately uniform manner to the first foam member 112 via the penetration holes 111A in the polishing liquid passage 111. The first foam member 112 filters the polishing liquid by capturing foreign particles, and supplies the filtered polishing liquid to the second foam member 113. The second foam member 113 supplies the filtered polishing liquid onto the surface of the disk substrate 21 while the second foam member 113 rotates. Because the aperture diameter D2 of the second foam member 113 is larger than the aperture diameter D1 of the first foam member 112, the filtered polishing liquid is smoothly supplied to the surface of the disk substrate 21. As a result, the surface of the disk substrate 21 is treated by being subjected to polishing and/or texturing in the circumferential direction by the cylindrical sponge-like brush of the polishing member 11, that is, the second foam member 113.

One driving unit for rotating the polishing member 11 may be provided with respect to each of the polishing members 11. Alternatively, a single driving unit may be provided to rotate a plurality of polishing members 11.

In this embodiment, the polishing liquid penetrates from the inside of the polishing member 11 and is supplied directly to the surface of the disk substrate 21. For this reason, foreign particles are unlikely to mix into the polishing liquid from the external environment when the polishing liquid is supplied to the surface of the disk substrate 21, and it is possible to effectively suppress the generation of scratches on the surface of the disk substrate 21.

In addition, although the filtering of the polishing liquid within the polishing member 11 is carried out in two stages in this embodiment by the first and second foam members 112 and 113, the filtering of the polishing liquid within the polishing member 11 may of course be carried out in one or a plurality of stages, including three or more stages. What is required of the polishing member 11 is to have a plurality of aperture diameters in a radial direction of the polishing member 11. More particularly, the aperture diameter of the polishing member 11 should be made smaller at the portion which receives the polishing liquid in order to realize the function of capturing large particles, and the aperture diameter of the polishing member 11 should be made larger at the portion which supplies the polishing liquid to the disk substrate 21. According to this configuration, it is possible to positively suppress the generation of scratches on the disk substrate 21 caused by foreign particles which mix into the polishing liquid, because the large particles are captured at the portion of the polishing member 11 having the smaller aperture diameter while the polishing liquid is smoothly supplied to the disk substrate 21 from the portion of the polishing member 11 having the larger aperture diameter and the surface of the disk substrate 21 is polished by the soft brush surface of the portion of the polishing member 11 having the larger aperture diameter. Furthermore, because the second foam member 113 which is used for the polishing is formed by the sponge-like brush, the outer peripheral surface of the polishing member 11 is extremely soft compared to a polyurethane polishing pad or the like which is conventionally used, and scratches are unlikely to be generated on the surface of the disk substrate 21. In a case where the polishing liquid is filtered in a single filtering stage, the polishing member 11 may be formed by a foam member having apertures with aperture diameters that continuously increase towards the outer periphery of the polishing member 11.

In a case where a plurality of polishing members 11 are provided with respect to a single surface of the disk substrate 21, at least one of the polishing members 11 may have the configuration to supply the polishing liquid while the other polishing members 11 may have a configuration which does not supply the polishing liquid. Moreover, polishing liquids having mutually different particle diameters may be supplied to the plurality of polishing members 11 which supply the polishing liquids to the same surface of the disk substrate 21. Further, the plurality of polishing members 11 which supply the polishing liquid to the same surface of the disk substrate may use first foam members 112 and/or second foam members 113 having mutually different aperture diameters. The various configurations of the polishing member 11 may be appropriately selected depending on the treatment to be made with respect to the disk substrate 21.

Next, a description will be given of experimental results which are obtained using samples of the embodiment described above and a comparison example.

Figure 5:
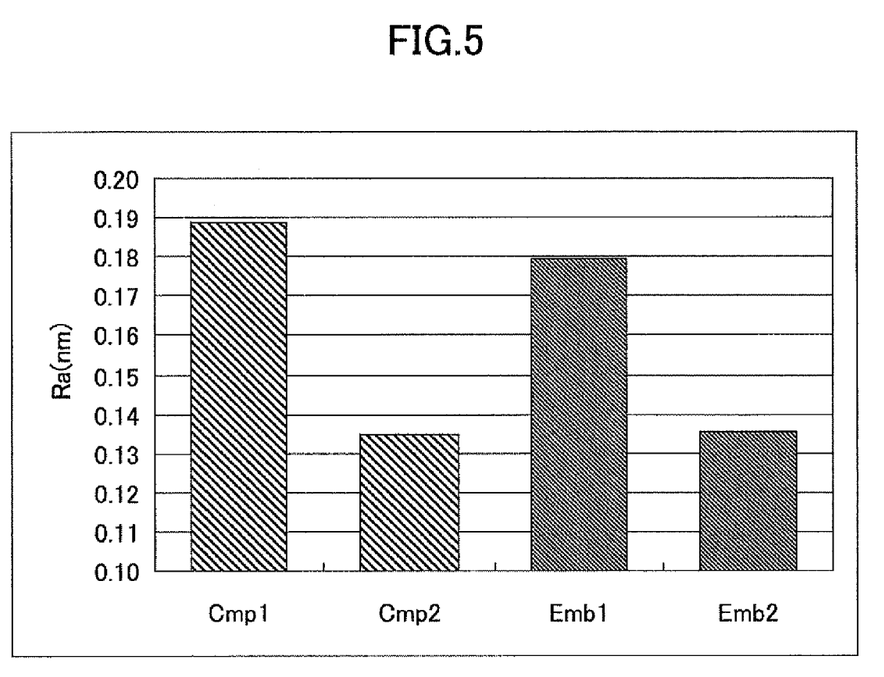
FIG. 5 is a diagram showing substrate surface roughnesses.

FIG. 5 is a diagram showing substrate surface roughnesses Ra (nm) of samples Emb1 and Emb2 of the embodiment and samples Cmp1 and Cmp2 of the comparison example. The substrate surface roughnesses Ra were measured using an Atomic Force Microscope (AFM).

The embodiment samples Emb1 and Emb2 used an aluminum substrate which has been plated with NiP as the disk substrate 21, a PVA sponge (BELLCLEAN (registered trademark) manufactured by AION Co., Ltd) having an aperture diameter D1 of approximately 100 μm to approximately 200 μm as the first foam member 112, and PVA sponge having a filtering accuracy of approximately 1 μm. The rotational speed of the polishing member 11 was set to 360 rpm, the polishing liquid was supplied by from the pump 31 to the polishing member 11 at a flow rate of 12 cc per minute (cc/min), and the polishing time was set to 85 seconds (s). The embodiment sample Emb1 used pure water as the polishing liquid, while the embodiment sample Emb2 used a diamond abrasive grain polishing liquid which includes diamond abrasive grains with a grain diameter D50=0.2 μm as the polishing liquid.

The same disk substrate 21 used for the embodiment samples Emb1 and Emb2 were used for the comparison samples Cmp1 and Cmp2. The comparison sample Cmp1 corresponds to the disk substrate 21 before being subjected to the surface treatment by the polishing member 11 or the like. The comparison sample Cmp2 used the same diamond abrasive grain polishing liquid used for the embodiment sample Emb2, and the surface of the disk substrate 21 was subjected to the conventional surface treatment described above in conjunction with FIGS. 1A and 1B.

Figure 6:
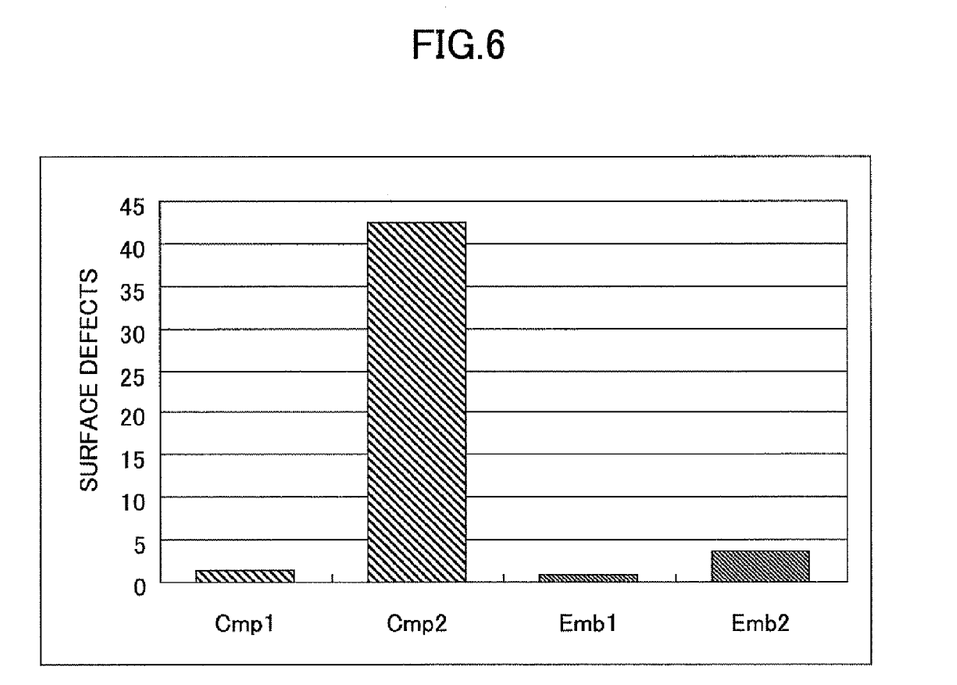
FIG. 6 is a diagram showing surface defects per unit area of embodiment samples Emb1 and Emb2 and comparison samples Cmp1 and Cmp2.

FIG. 6 is a diagram showing surface defects (that is, the number of surface defects) per unit area of the embodiment samples Emb1 and Emb2 and the comparison samples Cmp1 and Cmp2. The surface defects per unit area, that is, the number of scratches, were measured using an Optical Surface Analyzer (OSA). An OSA model OSA-6100 manufactured by Candela Instruments was used for the OSA.

Figure 7:
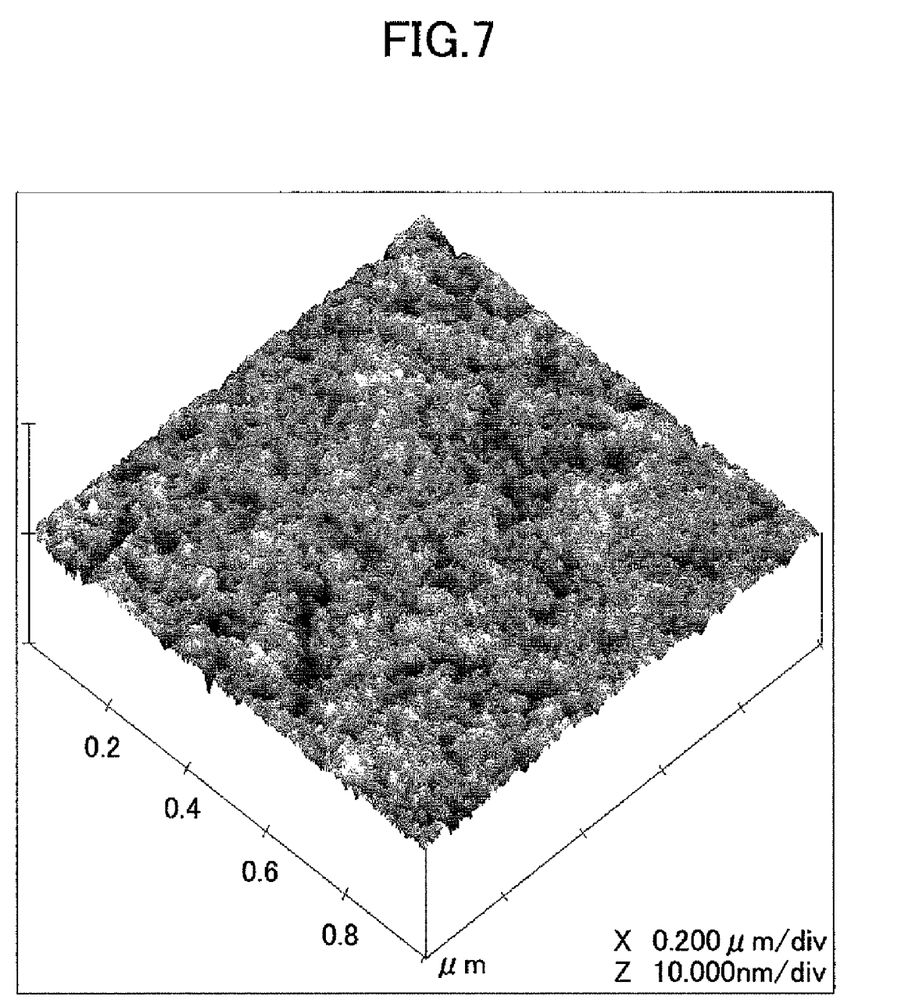
FIG. 7 is diagram showing an Atomic Force Microscope (AFM) image of the comparison sample Cmp1.
Figure 8:
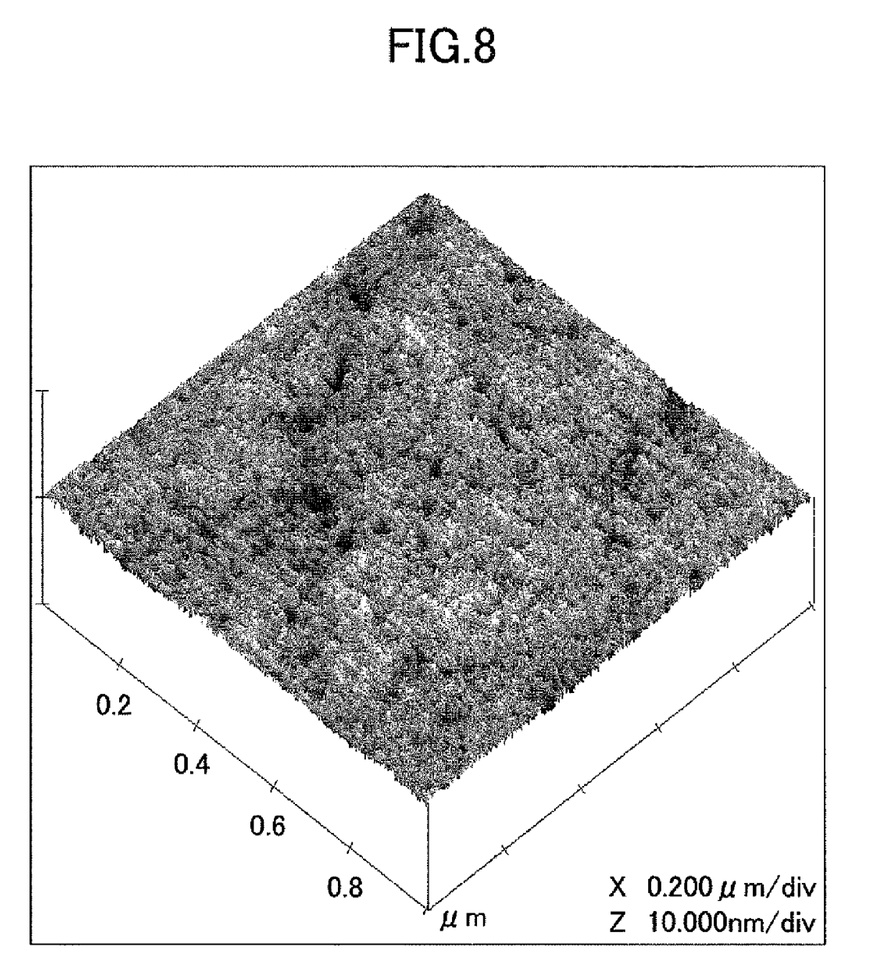
FIG. 8 is a diagram showing an AFM image of the embodiment sample Emb2.

FIG. 7 is diagram showing an AFM image of the comparison sample Cmp1, and FIG. 8 is a diagram showing an AFM image of the embodiment sample Emb2. The AFM images shown in FIGS. 7 and 8 picked up using the AFM which was used to measure the substrate surface roughnesses Ra shown in FIG. 5.

As may be seen from FIGS. 5 and 6, it was confirmed that the substrate surface roughness Ra of the embodiment sample Emb1 is lower than that of the comparison sample Cmp1, and the number of surface defects of the embodiment sample Emb1 is approximately the same as that of the comparison sample Cmp1. In addition, it was confirmed that the substrate surface roughness Ra of the embodiment sample Emb2 is approximately the same as that of the comparison sample Cmp2, and the number of surface defects of the embodiment sample Emb2 is considerably lower than that of the comparison sample Cmp2 and is approximately the same as that of the comparison sample Cmp1. Further, as may be seen from the AFM images of FIGS. 7 and 8, it was confirmed that the substrate surface roughness Ra of the embodiment sample Emb2 is considerably improved compared to that of the comparison sample Cmp1. In other words, according to the embodiment described above, it is possible to reduce the surface roughness Ra of the disk substrate 21 and suppress the generation of scratches on the surface of the disk substrate 21, as may be seen from the measurement results of the embodiment sample Emb2.

Figure 9:
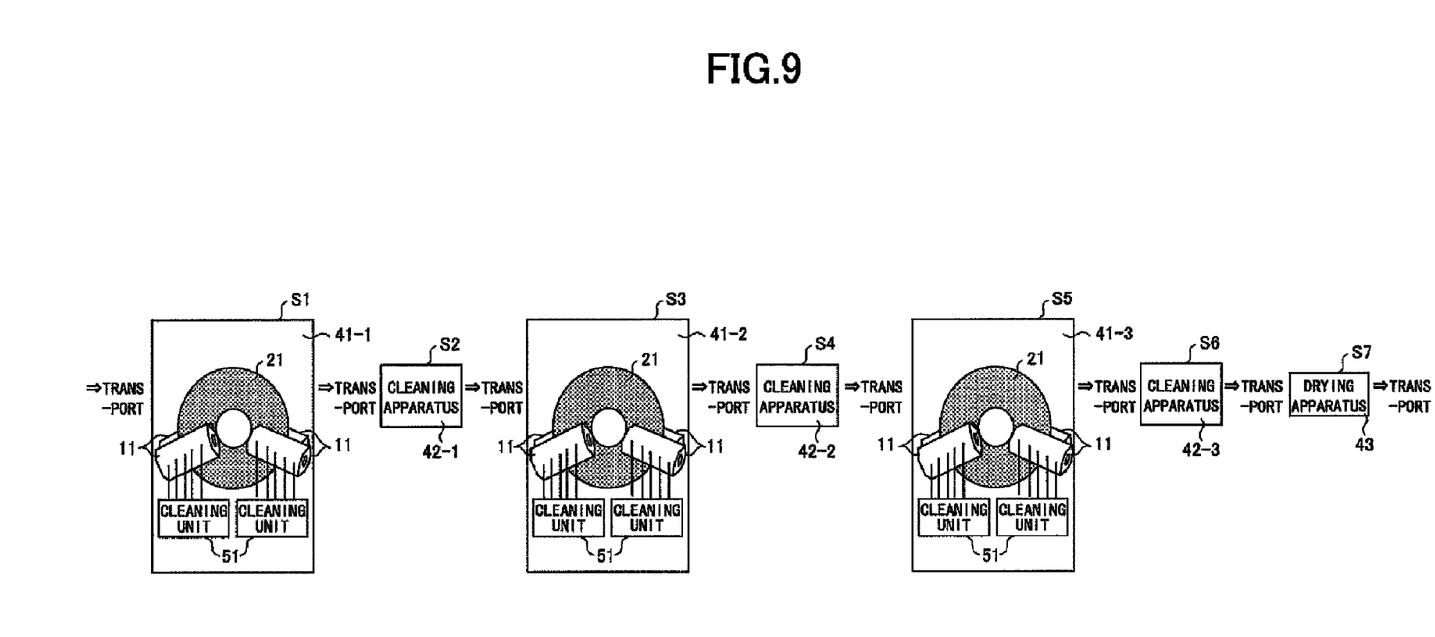
FIG. 9 is a diagram for explaining a magnetic disk manufacturing method.

FIG. 9 is a diagram for explaining a magnetic disk manufacturing method. FIG. 9 shows an example where three surface treating apparatuses of the embodiment described above. Surface treating apparatuses 41-1, 41-2 and 41-3 used in steps S1, S3 and S5 have the same structure as that shown in FIGS. 2A and 2B, and a cleaning unit 51 which outputs a shower of a cleaning liquid is provided with respect to each polishing member 11. Ultrasonic dip cleaning apparatuses 42-1, 42-2 and 42-3 used in steps S2, S4 and S6 have a known structure.

The disk substrate 21, which forms a work, is transported to the surface treating apparatus 41-1 by a known transport mechanism or means (not shown), and the surface processing apparatus 41-1 treats the surface of the disk substrate 21 by the polishing members 11. The treated disk substrate 21 is transported to the ultrasonic dip cleaning apparatus 42-1 by a known transport mechanism or means (not shown) and is cleaned by the ultrasonic dip cleaning apparatus 42-1. The cleaned disk substrate 21 is transported to the surface treating apparatus 41-2 by a known transport mechanism or means (not shown).

The surface processing apparatus 41-2 treats the surface of the disk substrate 21 by the polishing members 11. The treated disk substrate 21 is transported to the ultrasonic dip cleaning apparatus 42-2 by a known transport mechanism or means (not shown) and is cleaned by the ultrasonic dip cleaning apparatus 42-2. The cleaned disk substrate 21 is transported to the surface treating apparatus 41-3 by a known transport mechanism or means (not shown).

The surface processing apparatus 41-3 treats the surface of the disk substrate 21 by the polishing members 11. The treated disk substrate 21 is transported to the ultrasonic dip cleaning apparatus 42-3 by a known transport mechanism or means (not shown) and is cleaned by the ultrasonic dip cleaning apparatus 42-3. The cleaned disk substrate 21 is transported to a drying apparatus 43 by a known transport mechanism or means (not shown). The disk substrate 21 is dried by the drying apparatus 43 in a step S7, and is transported to the outside by a known transport mechanism or means (not shown).

Polishing liquids having mutually different particle diameters may be supplied to the polishing member 11 of each of the surface treating apparatuses 41-1 through 41-3 depending on the surface treatment that is required of the disk substrate 21. In addition, the polishing members 11 of the surface treating apparatuses 41-1 through 41-3 may use first foam members 112 and/or second foam members 113 having mutually different aperture diameters.

This application claims the benefit of a Japanese Patent Application No. 2008-140393 filed May 29, 2008, in the Japanese Patent Office, the disclosure of which is hereby incorporated by reference.

Further, the present invention is not limited to these embodiments, but various variations and modifications may be made without departing from the scope of the present invention.

What is claimed is:

1. A surface treating method for treating a substrate surface by at least one of polishing and texturing in a predetermined direction by rotating a cylindrical polishing member in a state where the polishing member makes contact with the substrate surface, said surface treating method comprising the steps of:

(a) supplying a polishing liquid to a polishing liquid passage that is provided in a central portion of the polishing member along a rotary axis of the polishing member; and (b) supplying the polishing liquid to the substrate surface by rotating the polishing member about the rotary axis while filtering the polishing liquid by a foam member provided on an outer periphery of the polishing liquid passage, wherein aperture diameters of the foam member are larger on the side of the polishing liquid passage than on the outside of the polishing member.

2. The surface treating method as claimed in claim 1, wherein said step (b) filters the polishing liquid in a plurality of stages by a plurality of foam members which are provided coaxially.

3. The surface treating method as claimed in claim 1, further comprising the step of:

(c) cleaning a surface of the polishing member by a shower of a cleaning liquid.

4. The surface treating method as claimed in claim 3, wherein said step (c) uses a cleaning liquid applied with ultrasonic waves.

5. The surface treating method as claimed in claim 1, wherein a plurality of cleaning members are used with respect to a single substrate surface, and said steps (a) and (b) are carried out with respect to at least one of said plurality of cleaning members.

6. The surface treating method as claimed in claim 5, wherein said steps (a) and (b) are carried by supplying polishing liquids having mutually different particle diameters to said plurality of polishing members.

7. The surface treating method as claimed in claim 5, wherein foam members having mutually different aperture diameters are used for said plurality of polishing members.

8. The surface treating method as claimed in claim 5, wherein said steps (a) and (b) are carried out simultaneously with respect to both substrate surfaces of a single substrate.

9. A surface processing apparatus comprising:

a cylindrical polishing member having a polishing liquid passage provided in a central portion thereof along a rotary axis of the polishing member, and a foam member provided on an outer periphery of the polishing liquid passage, said foam member having aperture diameters that are larger on the side of the polishing liquid passage than on the outside of the polishing member;

a polishing liquid supply unit configured to supply a polishing liquid to the polishing liquid passage; and a driving unit configured to rotate the polishing member, wherein a substrate surface is treated by at least one of polishing and texturing in a predetermined direction by rotating the polishing member by the driving unit in a state where the polishing member makes contact with the substrate surface and supplying the polishing liquid to the substrate surface from the polishing member while filtering the polishing liquid by the foam member.

10. The surface treating apparatus as claimed in claim 9, wherein the polishing member has a plurality of foam members which are provided coaxially, and filters the polishing liquid in a plurality of filtering stages.

11. The surface treating apparatus as claimed in claim 9, wherein a plurality of said polishing members are provided with respect to a single substrate surface.

12. The surface treating apparatus as claimed in claim 11, wherein the plurality of polishing members are supplied with polishing liquids having mutually different grain diameters.

13. The surface treating apparatus as claimed in claim 12, wherein the plurality of polishing members have foam members which have mutually different aperture diameters.

* * * * *